United States Patent Office 3,531,307
Patented Sept. 29, 1970

3,531,307
CERAMIC ARTICLE AND METHOD
FOR PRODUCING SAME
Jack Alvin Rubin, Glendale, William J. Denk, Burbank,
and Jeremy Bleecher, Los Angeles, Calif., assignors to
International Pipe and Ceramics Corporation, Los
Angeles, Calif., a corporation of Delaware
No Drawing. Filed Feb. 23, 1967, Ser. No. 617,852
Int. Cl. C04b 35/18
U.S. Cl. 106—62
12 Claims

ABSTRACT OF THE DISCLOSURE

A ceramic article which is resistant to thermal shock and has an extremely low coefficient of thermal expansion, said article consisting predominantly of a crystalline phase of alpha cordierite and a quantity of magnesium aluminum titanate distributed throughout. A method for producing said article by firing a proper mixture of $SiO_2$, $Al_2O_3$, MgO, and $TiO_2$.

BACKGROUND OF THE INVENTION

There is great need in industry for a refractory composition capable of being formed into dimensionally stable articles adapted to withstand high temperatures on the order of, say, 2,000°–2,400° F. In addition, such articles should be capable of withstanding appreciable loads and therefore should have a modulus of rupture even at elevated temperatures permitting their use as supports, kiln furniture, etc. Refractory compositions and articles of this character can be used for the manufacture of precision molds, kiln furniture, car tops, pouring pit refractories, etc. In some of these uses, the article is subjected to rapid cooling (as by quenching) and must maintain dimensional stability even under such terriffic thermal shock.

It has been known that magnesium aluminum silicates of molecular ratios closely approximating that of cordierite have rather high resistance to thermal shock but their coefficient of thermal expansion ordinarily is within the range 4.5 to $1.9 \times 10^{-6}/°$ C. and therefore the objects cannot be subjected to quenching without disruption. The present invention is based upon the discovery that by use of very finely ground starting materials within a range of proportions given hereinafter, and by maintaining the chemical analysis of the mixture within predetermined ranges and bringing the objects (made by pressing under relatively high pressures) to a high temperature which is maintained for an appreciable soaking period, it is possible to obtain articles which have a coefficient of expansion of appreciably less than $1.8 \times 10^{-6}/°$ C., preferred articles having a coefficient of expansion (within the temperature range of 25–700° C.) of between 0.6 and $1.2 \times 10^{-6}/°$ C. The resistance of such articles to thermal shock is extraordinary; a plate or tile 12″ x 12″ x ½″ can have its center portion reduced to liquidity and the hot article quenched in cold water without shattering or exhibiting any sign of failure.

SUMMARY OF THE INVENTION

Generally stated therefore, the present invention is based upon the discovery that the remarkable thermal resistance and low coefficient of expansion is the result of a composition which, when properly burned or fired, and maintained at a high soaking temperature for an appreciable length of time develops a body consisting predominantly of crystalline phase of alpha cordierite (e.g. 90–99% by weight) and a small but important quantity (e.g. 1–5% by weight) of a magnesium aluminum titanate homogeneously distributed throughout the fired object, the last phase being in quantity sufficient to impart to said article a coefficient of thermal expansion of less than $1.8 \times 10^{-6}/°$ C. within the range 25° C.–700° C. In addition, the composition may contain a minor amount of a glassy phase (e.g. 0–5% by weight).

An object of the present invention therefore is to disclose and provide a dimensionally stable formed, highly refractory ceramic article which is highly resistant to thermal shock and has an extremely low coefficient of thermal expansion in the range 25° C.–700° C., such coefficient being less than $1.8 \times 10^{-6}/°$ C.

A further object is to disclose and provide dimensionally stable, strong refractory ceramic objects highly resistant to thermal shock and having a very low insignificant coefficient of thermal expansion, the objects being characterized by the presence of a homogeneously distributed magnesium aluminum titanate phase therethrough.

A further object is to disclose and provide a grog useful in the production of highly refractory articles having a low coefficient of thermal expansion.

Another object of the invention is to disclose and provide a process of manufacturing refractory ceramic articles of low coefficient expansion, by the utilization of finely divided minerals and compounds intermixed to form a body coming within a chemical analysis range given hereinafter, the formed articles being burned under temperature and time conditions as hereinafter stated.

These and various other uses and advantages of the present invention will become apparent to those skilled in the art from the following detailed description of exemplary compounds, procedures and conditions under which the products can be obtained.

DETAILED DESCRIPTION

In order to attain products and articles exhibiting the highly desirable and unusual properties herein referred to, it is necessary that all of the components of the mixture of ceramic starting materials be in a state of fine division. Moreover, the content of alkalies ($Na_2O$ and $K_2O$), which are almost inevitable impurities, should be maintained as low as possible, e.g., below 0.5%; the content of CaO should also be kept quite low, i.e., below about 1.5%. These requirements should be kept in mind whenever talc is utilized as one of the starting materials. The talc, clay and aluminum oxide employed should preferably be preground to pass 100 mesh sieve and preferably to pass a 200 mesh sieve. Air floated clays and alumina passing 325 mesh is preferred. Any compound which forms magnesium oxide in situ may be used. Technical grades of magnesium oxide, magnesium carbonate, magnesium basic carbonate and magnesium hydroxide may be employed and should be in powdered form.

The components of the mixed materials employed in making the press formed articles of this invention consist essentially of $SiO_2$, $Al_2O_3$, MgO, and $TiO_2$, the weight ratio of $SiO_2$ to $Al_2O_3$ being about 1:0.65–1.0, the weight ratio of $SiO_2$ to MgO being about 1:0.27–0.40, and the amount of $TiO_2$ being from 0.7% to 4%, based on the total weight of MgO, $Al_2O_3$ and $SiO_2$. In addition, the amount of $Na_2O$ and $K_2O$, based on the weight of the total composition, should be less than 0.5% (preferably less than 0.3%) and the amount of CaO, based on the total weight of the composition, should be less than 0.9%.

Materials suitable for the preparation of the articles are exemplified by the following materials and their chemical analysis:

|  | Ione washed clay | A-2 alumina | Holiday talc | Magcarb.[1] (light) | MgO (Reagent grade) |
|---|---|---|---|---|---|
| $SiO_2$, percent | 46.25 | 0.02 | 58.51 | 0.15 | [2] |
| $Al_2O_3$, percent | 38.96 | 99.20 | 0.86 | 0.07 | [2] |
| $Fe_2O_3$, percent | 0.32 | 0.03 | 1.12 | 0.02 | [2] |
| $TiO_2$, percent | 1.90 | [2] | 0.10 | [2] | [2] |
| CaO, percent | [2] | [2] | 1.20 | 0.54 | [3] |
| MgO, percent | [2] | [2] | 33.18 | 42.50 | 98.0 |
| $Na_2O$, percent | 0.03 | 0.45 | 0.22 | [2] | [3] |
| $K_2O$, percent | [2] | [2] | 0.06 | [2] | [3] |
| L.O.I.[4], percent | 13.48 | 0.02 | 6.14 | 56.30 | 2.0 |
| Total | 100.94 | 99.90 | 100.39 | 99.58 | 100.0 |

[1] Magcarb.=magnesium carbonate.
[2] Nil.
[3] Trace.
[4] L.O.I.=loss on ignition.
Note.—All percentages are by weight.

It is not necessary to use Ione washed clay; however, it is advantageous to use this clay because (1) it is composed mainly of kaolinite and hence relatively free of such deleterious impurities as $K_2O$, $Na_2O$, $Fe_2O_3$, and CaO; (2) it has a relatively low quartz content (5–7%) making it essentially free of anomalous thermal expansions; and (3) it contains from 1.5% to 2.5% $TiO_2$. This is desirable because having the $TiO_2$ in the clay assures good distribution thereof. Clays of this type are preferred but other clays of low alkali content can be used. If the $TiO_2$ content in the particular clay is not sufficient to produce a final product containing 1% to 5% of a magnesium aluminum titanate phase, then additional $TiO_2$ can be added.

Exemplary mixed compositions employing the above raw materials are given in the following table:

|  | C-3607 | C-3615 |
|---|---|---|
| Holiday talc, −200 mesh | 29.3 | 28.1 |
| Ione washed clay | 59.7 | 57.4 |
| A-2 alumina, −325 mesh | 7.9 | 7.6 |
| MgO, reagent grade | 3.1 | |
| Magcarb., light | | 6.9 |

The above exemplary mixed compositions have the following chemical analysis:

|  | C-3607 | C-3615 |
|---|---|---|
| $SiO_2$, percent | 49.81 | 49.92 |
| $Al_2O_3$, percent | 33.48 | 33.28 |
| $Fe_2O_3$, percent | 0.60 | 0.40 |
| $TiO_2$, percent | 1.20 | 1.30 |
| CaO, percent | 0.15 | 0.75 |
| MgO, percent | 15.22 | 13.54 |
| $Na_2O$, percent | 0.03 | 0.25 |
| $K_2O$, percent | 0.05 | 0.16 |
| L.O.I.[1], percent | 0.06 | 0.02 |

[1] L.O.I.=loss on ignition.
Note.—Percentages are all by weight.

DRY PRESS BODY

The components of the mix (C-3607) are preferably dry-mixed for a short period of time, 5%–10% (preferably 5%–7%) of water being then added and the mixture tempered and granulated through a ten mesh screen and the tempered mixture then press-formed at over 8,000 p.s.i. (preferably about 10,000 p.s.i.) into articles of desired shape and size. The amount of water added was based upon the weight of the dry mix. The pressed articles are then preferably air dried, or dried overnight at, say, 200° F. and then fired under normal oxidizing conditions. Firing is preferably carried out at a temperature of between about 2400° F. and 2580° F., such temperatures being reached in 20–24 hours; upon reaching the aforesaid temperature range the articles are maintained at such temperature for a period of not less than about 2 hours and preferably 20 to 30 hours. The soaking at the high temperature is very important since it is conducive to the development of the magnesium aluminum titanate which apparently causes the remarkable reduction in the coefficient of expansion. Body C-3607 (specified in the previous table) will have a coefficient of expansion of about $1.4 \times 10^{-6}/°C$. when fired at 2530° F. and soaked for a period of about 8 hours whereas, at the same firing temperature but a soaking time of 14 hours, the coefficient of expansion is reduced to $1.0 \times 10^{-6}/°C$. and, after soaking for 20 hours, the coefficient of expansion is reduced to about 0.7.

RAM PRESS BODY

The components of the mix (C-3615) are dry-mixed and then 15–40% (preferably 33%) water, based on the weight of the dry mix, is added. The mix is pug milled and auger extruded under a vacuum of 28 inches of mercury into 2½ inch diameter cylinders and then Ram-pressed into various configurations. The Ram-pressed bodies are air-dried and then oven-dried overnight at 200° F. The dried bodies are fired at 2530° F., this temperature being reached in 21 hours, and then soaked at this temperature for 28 hours. The bodies are then allowed to cool in the furnace. The bodies have a coefficient of expansion of $0.93 \times 10^{-6}/°C$.

In order to increase plasticity it is sometimes desirable to substitute about ⅓ of the Ione washed clay with B-3, 4 clay which has the following chemical analysis:

Material: Weight percent
$SiO_2$ _____ 48.6
$Al_2O_3$ _____ 33.5
$Fe_2O_3$ _____ 1.7
$TiO_2$ _____ 1.6
CaO _____ 0.3
MgO _____ 0.5
$Na_2O + K_2O$ _____ 0.6
L.O.I. (loss on ignition) _____ 13.2

The B-3, 4 clay is primarily kaolinitic "fireclay" mineral, about 10%, by weight, alpha quartz, and some montmorillonite.

An exemplary mix, using the B-3, 4 clay is as follows:

Material: Weight percent
Holiday talc _____ 28.1
B-3, 4 clay _____ 19.0
Ione washed clay _____ 38.4
Magcarb. (magnesium carbonate) (light) _____ 6.9
A-2 Alumina _____ 7.6

The components of the mix are dry mixed and then 28% water (based on the weight of the dry mix) is added. The mix is milled, extruded, dried and fired in the same manner as the C-3615 mix, explained supra. The thus produced body has a coefficient of thermal expansion less than $1.8 \times 10^{-6}/°C$.

In order to improve the green strength of the body 1% lignosite (based on the weight of the dry mix) is added.

Lignosite consists of 80% by weight of calcium lignin sulfonate, 15% by weight of carbohydrates and carbohydrate sulfonates, and 5% by weight of other constituents, mostly inorganic salts.

In the production of Ram-pressed bodies it is desirable to introduce grog into the Ram-pressed bodies. This aids in preventing cracks due to excessive firing shrinkage. The grog (C–9649) has the following formulation:

C–9649 GROG

| Material: | Weight percent |
|---|---|
| Holiday talc | 28.1 |
| B–3, 4 clay | 19.0 |
| Ione washed clay | 38.4 |
| Magcarb. (magnesium carbonate) (light) | 6.9 |
| A–2 Alumina | 7.6 |

The grog is screened to 10 mesh and then milled in a Fitzmill Hammermill with a 16 mesh screen. The resulting milled grog has the following screen analysis:

| Screen: | Percent coarser |
|---|---|
| 20 | 0 |
| 28 | Trace |
| 35 | 0.4 |
| 48 | 3.3 |
| 65 | 11.9 |
| 100 | 15.5 |
| 150 | 15.8 |
| 200 | 12.6 |
| 250 | 3.8 |
| 325 | 9.5 |
| –325 | 27.3 |

The hammermilled grog, having the above screen analysis, is mixed with a composition composed of Holiday talc, B–3, 4 clay, Ione washed clay, Magcarb., and A–2 Alumina to produce the following composition:

| Material: | Weight percent |
|---|---|
| Holiday talc | 14.05 |
| B–3, 4 clay | 9.50 |
| Ione washed clay | 19.20 |
| Magcarb. (light) | 3.45 |
| A–2 Alumina | 3.80 |
| Grog (C–9649) | 50.00 |

12% water, based on the dry weight, is added to the above-identified composition and thoroughly mixed in a pug mill. 16% more water based on the dry weight, is added and the resulting composition is auger extruded into slabs. The slabs are Ram-pressed and the resulting bodies are air-dried for 24 hours and oven-dried for 24 hours at a temperature of, e.g. 200° F. The dried bodies are fired at between 2400° F. and 2580° F., the final temperature being reached in 20–24 hours. They are soaked from 10–30 hours at this temperature and cooled. The bodies have a coefficient of expansion of less than $1.8 \times 10^{-6}/°$ C.

Another important characteristic of the fired bodies produced in accordance with the present invention is the relatively high modulus of rupture at temperatures up to about 2400° F. In most instances, failure takes place at temperatures of, say, 2300°–2400° F. by brittle fracture, with no apparent plastic deformation, although some deformation may occur at temperatures about 2400° F. Maximum service temperatures for these bodies appears to be 2300°–2400° F. Reference to the remarkable resistance to thermal shock has been made heretofore and substantially all of the bodies within the ranges and proportions given will withstand quenching from temperatures on the order of 2100° F.– 2200° F. without cracking or failure.

Examination of the fired objects indicates that two distinct phases are present, the majority of the body (e.g. 90–99%) consisting of cordierite in either alpha or beta forms or a mixture of the two. The cordierite appears to be composed of $2MgO \cdot 2Al_2O_3 \cdot 5SiO_2$. Homogeneously distributed throughout the body is a quantity (e.g. 1–5%) of a phase composed of magnesium aluminum titanate approximating the composition $4MgO \cdot Al_2O_3 \cdot 9TiO_2$. Although this phase is minor in relative quantity (rarely exceeding 5%) its formation is essential in order to attain the remarkably low coefficient of expansion. The presence of available magnesium oxide along with available $TiO_2$ is essential for the in situ production of the magnesium aluminum titanate.

In addition to the two phases discussed above, the fired objects may contain a minor amount (e.g. 0–5%) of a glassy phase.

While we have described this invention with respect to certain specific embodiments, it is understood that various modifications may be made thereof without departing from the spirit and scope of the invention as claimed hereinafter.

It is understood that equipment, specific screen analyses, etc. referred to in the examples, are simply illustrative of types and ranges which may be used.

We claim:

1. A dimensionally stable, formed, highly refractory ceramic article which is highly resistant to thermal shock, consisting essentially of cordierite and a magnesium aluminum titanate phase substantially homogeneously distributed throughout the article, said last phase being present in quantities sufficient to impart to said article a coefficient of thermal expansion less than $1.8 \times 10^{-6}/°$ C. within the range 25° C. to 700° C.

2. A ceramic article according to claim 1 wherein the article contains a minor glassy phase.

3. A ceramic article according to claim 1 wherein the magnesium aluminum titanate approximates the composition $4MgO \cdot Al_2O_3 \cdot 9TiO_2$.

4. A dimensionally stable, formed highly refractory ceramic article which is highly resistant to thermal shock, said article consisting essentially of from 90 to 99%, by weight, of a cordierite phase, from 0 to 5%, by weight, of a glassy phase, and from 1 to 5%, by weight, of a magnesium aluminum titanate phase substantially homogeneously distributed throughout the article.

5. A ceramic article according to claim 4 wherein the magnesium aluminum titanate approximates the composition $4MgO \cdot Al_2O_3 \cdot 9TiO_2$.

6. In a process of manufacturing refractory ceramic articles having a coefficient of thermal expansion at 25°–700° C. of less than $1.8 \times 10^{-6}/°$ C., said article being resistant to thermal shock and having a high modulus of rupture, the steps of: press forming articles from a mixture consisting essentially of $SiO_2$, $Al_2O_3$, MgO, and $TiO_2$, the $TiO_2$ being homogeneously distributed throughout the composition, the weight ratio of $SiO_2$ to $Al_2O_3$ being about 1:0.65–1.0, the weight ratio of $SiO_2$ to MgO being about 1:0.27–0.40, and the amount of $TiO_2$ being from about 0.7% to 4% based on the total weight of MgO, $Al_2O_3$, and $SiO_2$; and firing the articles thus formed to a temperature of between about 2400° F. and 2580° F., said firing including a soaking within said temperature range for a time sufficient for the in situ production of a magnesium aluminum titanate in a major phase of cordierite.

7. A process according to claim 6 wherein the article is soaked for at least 10 hours.

8. A process according to claim 7 wherein the mixture contains less than 0.5% of alkalies and less than 1.5% CaO.

9. A process according to claim 8 wherein the mixture is tempered with from 5% to 10% of water based on the dry weight of the mixture, granulated and pressed at a pressure of over 8,000 lbs. per square inch.

10. A process according to claim 8 wherein from 15% to 40% by weight of water is added to the mixture, intimately admixing the wet mixture, forming slugs therefrom, drying the slugs, and pressing the slugs.

11. A grog for use in producing refractory ceramic articles having a low coefficient of thermal expansion, consisting of an aggregate of small particles, each particle being composed predominately of from 90 to 99%, by weight, of a cordierite phase, from 0 to 5%, by weight, of a glassy phase, and from 1 to 5%, by weight, of a magnesium aluminum titanate phase substantially homogeneously distributed throughout each particle.

12. A grog according to claim 11, wherein the magnesium aluminum titanate approximates the composition $4MgO \cdot Al_2O_3 \cdot 9TiO_2$.

References Cited
UNITED STATES PATENTS

| | | | |
|---|---|---|---|
| 2,864,919 | 12/1958 | Stringfellow | 106—62 |
| 2,920,971 | 1/1960 | Stookey | 106—39 |

JAMES E. POER, Primary Examiner

U.S. Cl. X.R.

106—65